US012800009B2

(12) United States Patent
Taga

(10) Patent No.: US 12,800,009 B2
(45) Date of Patent: Nov. 17, 2026

(54) TOOTHED BELT

(71) Applicant: BANDO CHEMICAL INDUSTRIES, LTD., Kobe (JP)

(72) Inventor: Atsushi Taga, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 24 days.

(21) Appl. No.: 19/221,147

(22) Filed: May 28, 2025

(65) Prior Publication Data

US 2025/0290559 A1 Sep. 18, 2025

Related U.S. Application Data

(63) Continuation of application No. PCT/JP2023/039792, filed on Nov. 6, 2023.

(30) Foreign Application Priority Data

Nov. 29, 2022 (JP) ................................ 2022-189761

(51) Int. Cl.

*F16G 1/28* (2006.01)
*D03D 15/283* (2021.01)
*D03D 15/30* (2021.01)
*D06M 15/693* (2006.01)
*D06M 101/34* (2006.01)

(52) U.S. Cl.

CPC ............ *F16G 1/28* (2013.01); *D03D 15/283* (2021.01); *D03D 15/30* (2021.01); *D06M 15/693* (2013.01); *D06M 2101/34* (2013.01); *D10B 2331/02* (2013.01); *D10B 2505/02* (2013.01)

(58) Field of Classification Search

CPC .......... F16G 1/28; F16G 1/10; D03D 15/283; D03D 15/30; D03D 1/00; D03D 1/0094; D03D 3/04; D03D 13/008; D03D 15/43; D03D 15/58; D06M 15/693; D06M 2101/34; D10B 2331/02; D10B 2505/02; D10B 2403/0312

See application file for complete search history.

(56) References Cited

U.S. PATENT DOCUMENTS

| | | | | |
|---|---|---|---|---|
| 10,975,933 | B2 * | 4/2021 | Kunisada | D06N 3/0068 |
| 11,085,505 | B2 * | 8/2021 | Kagi | D06M 13/418 |
| 11,273,987 | B2 * | 3/2022 | Ishibashi | B65G 15/42 |
| 11,287,013 | B2 * | 3/2022 | Virtue | B32B 3/263 |
| 11,326,665 | B2 * | 5/2022 | Ozaki | F16G 1/00 |
| 11,473,648 | B2 * | 10/2022 | Ikeda | C08L 75/04 |
| 11,566,684 | B2 * | 1/2023 | Meki | F16H 1/28 |
| 11,592,079 | B2 * | 2/2023 | Suzuki | F16G 1/10 |
| 11,885,392 | B2 * | 1/2024 | Mitsutomi | B29D 29/08 |
| 12,208,586 | B2 * | 1/2025 | Joswig | B29D 29/06 |
| 12,352,333 | B2 * | 7/2025 | Gao | F16G 1/28 |

(Continued)

FOREIGN PATENT DOCUMENTS

| | | |
|---|---|---|
| JP | 2015-505353 A | 2/2015 |
| JP | 2020-104980 A | 7/2020 |

(Continued)

*Primary Examiner* — Henry Y Liu
(74) *Attorney, Agent, or Firm* — Maschoff Brennan

(57) ABSTRACT

A toothed belt includes a plurality of tooth bodies that are each covered by a reinforcing fabric to form teeth. Kurtosis of a surface roughness of a surface of the reinforcing fabric is 2.15 or more at the teeth.

15 Claims, 7 Drawing Sheets

(56) References Cited

U.S. PATENT DOCUMENTS

| | | | | |
|---|---|---|---|---|
| 2017/0191545 | A1* | 7/2017 | Sekiguchi | C08G 18/10 |
| 2019/0178339 | A1* | 6/2019 | Gao | B29D 29/08 |
| 2019/0315898 | A1* | 10/2019 | Casagrande | C08K 7/14 |
| 2019/0346014 | A1* | 11/2019 | Virtue | B32B 27/06 |
| 2020/0049230 | A1* | 2/2020 | Suzuki | F16G 1/28 |
| 2020/0080618 | A1* | 3/2020 | Kaneko | D03D 15/58 |
| 2020/0080619 | A1* | 3/2020 | Kaneko | D03D 15/43 |
| 2020/0115847 | A1* | 4/2020 | Oberste | D03D 41/00 |
| 2020/0124136 | A1* | 4/2020 | Kunisada | D06N 3/0068 |
| 2020/0182329 | A1* | 6/2020 | Ikeda | F16G 1/28 |
| 2020/0200232 | A1* | 6/2020 | Ozaki | F16G 1/28 |
| 2020/0240488 | A1* | 7/2020 | Meki | F16G 1/10 |
| 2020/0362940 | A1* | 11/2020 | Kagi | D06M 13/418 |
| 2021/0222756 | A1* | 7/2021 | Gao | B29D 29/08 |
| 2021/0396297 | A1* | 12/2021 | Mitsutomi | B29D 29/08 |
| 2022/0041378 | A1* | 2/2022 | Ishibashi | B65G 15/34 |
| 2023/0054996 | A1* | 2/2023 | Maren | B29D 29/06 |
| 2024/0151293 | A1* | 5/2024 | Gao | F16G 5/08 |

FOREIGN PATENT DOCUMENTS

| | | | |
|---|---|---|---|
| WO | 2013/098400 | A1 | 7/2013 |
| WO | 2016/047052 | A1 | 3/2016 |

* cited by examiner

TOOTHED BELT

CROSS-REFERENCE TO RELATED APPLICATIONS

This is a continuation of International Application No. PCT/JP2023/039792 filed on Nov. 6, 2023, which claims priority to Japanese Patent Application No. 2022-189761 filed on Nov. 29, 2022. The entire disclosures of these applications are incorporated by reference herein.

BACKGROUND

The present invention relates to a toothed belt.

Toothed belts are used for various kinds of synchronous power transmission. For example, International Publication No. WO2016/047052 discloses a toothed belt used for a machine tool, a printing machine, a textile machine, an injection molding machine, or the like, where the arithmetical mean roughness of an uneven surface of a tooth bottom between teeth is 5 μm to 25 μm in order to reduce the sound produced by hitting a pulley.

SUMMARY

The present invention is directed to a toothed belt including: a belt body including a flat band portion and a plurality of tooth bodies spaced at a constant pitch and integrated with one of surfaces of the flat band portion; and a reinforcing fabric covering a surface of the belt body on which the plurality of tooth bodies are provided, the plurality of tooth bodies being each covered by the reinforcing fabric to form teeth, wherein kurtosis of a surface roughness of a surface of the reinforcing fabric is 2.15 or more at the teeth.

DETAILED DESCRIPTION

Figure 1A:
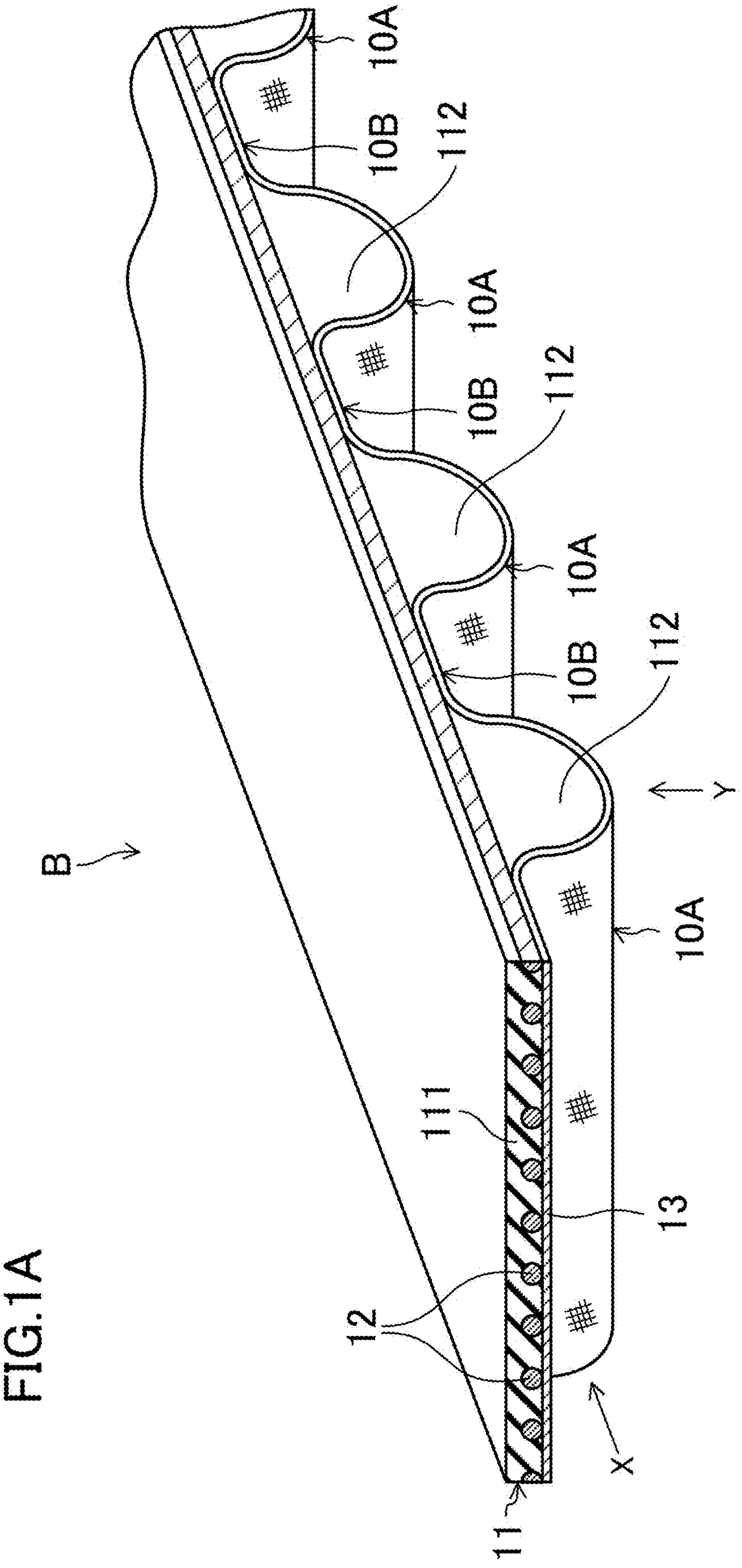
FIG. 1A is a perspective view of a piece of a toothed belt of an embodiment.
Figure 1B:
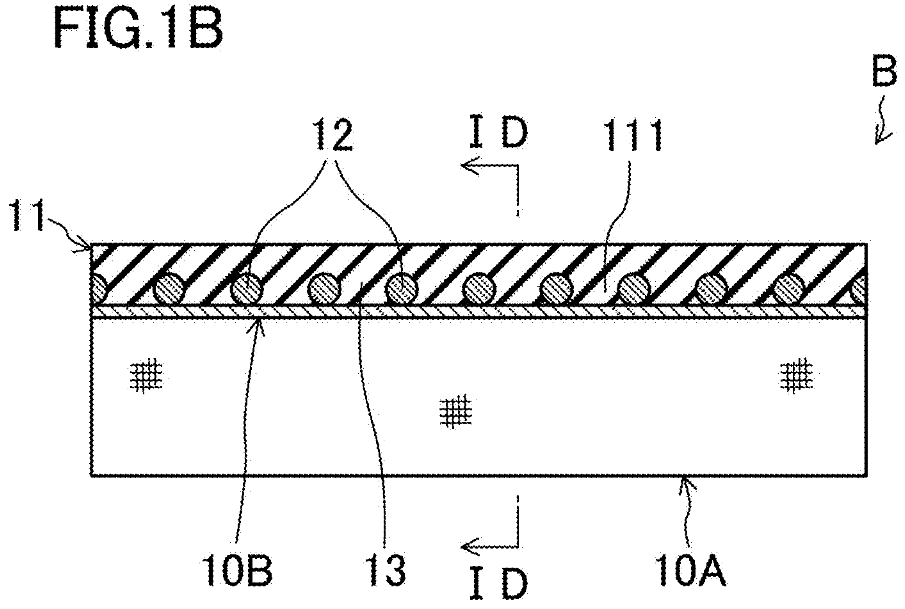
FIG. 1B is a front view as viewed in the direction of arrow X in FIG. 1A.
Figure 1C:
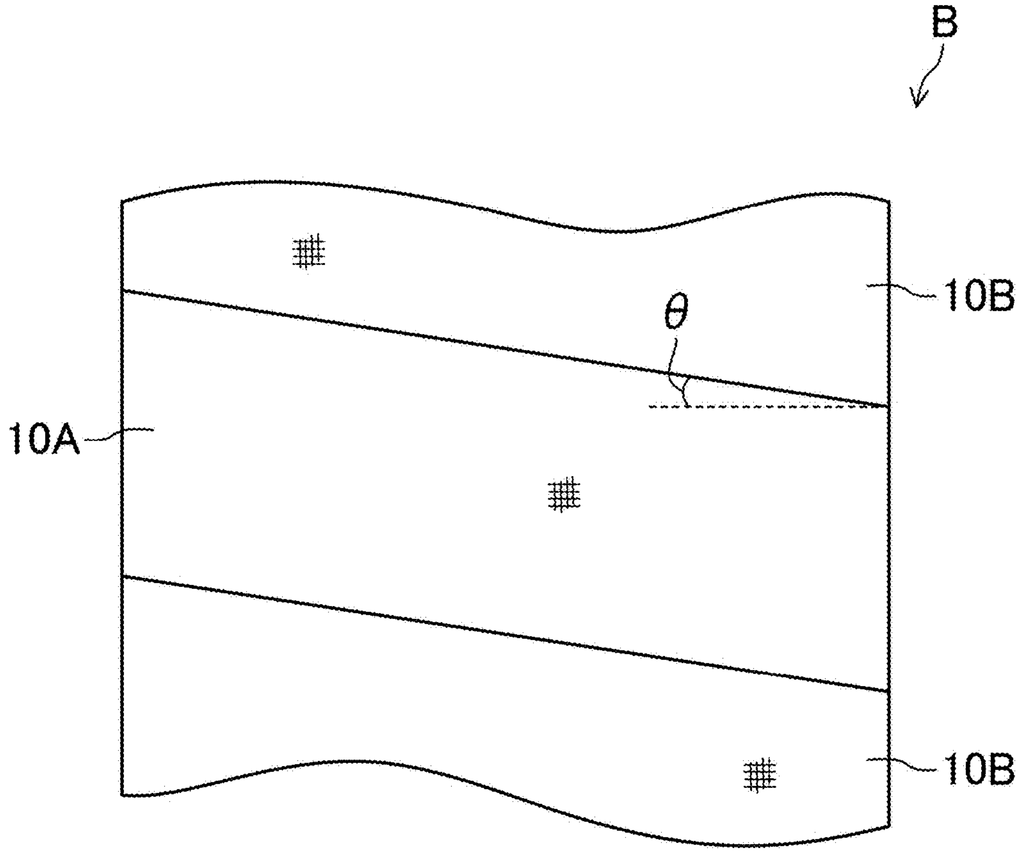
FIG. 1C is a front view as viewed in the direction of arrow Y in FIG. 1A.
Figure 1D:
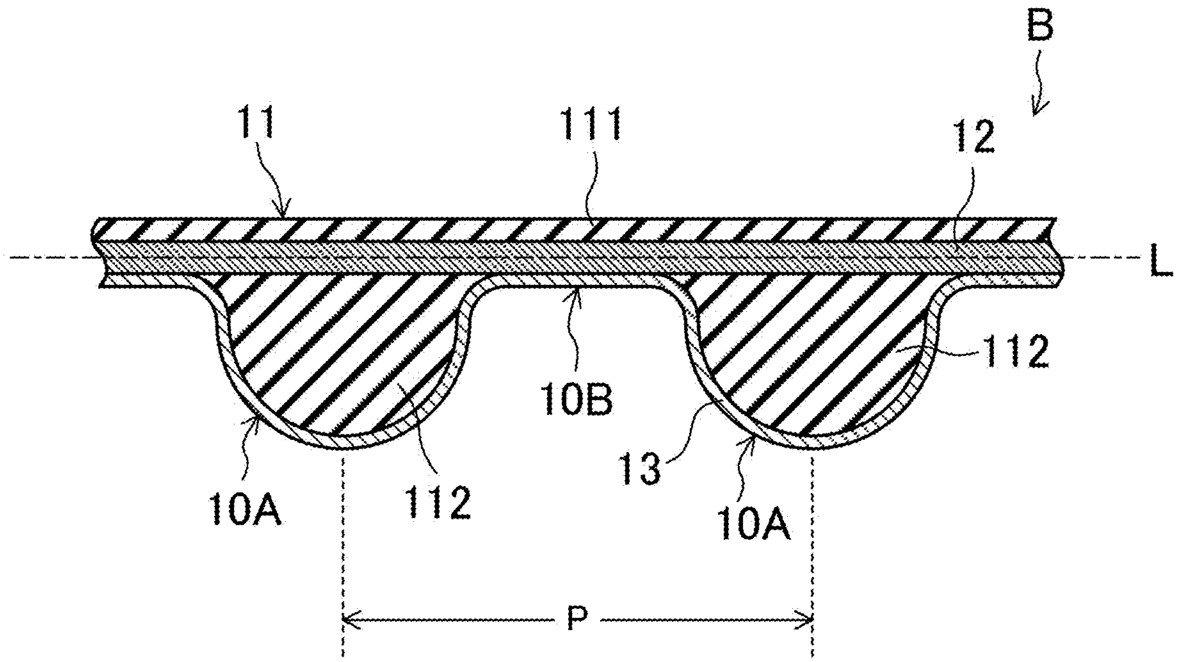
FIG. 1D is a cross-sectional view taken along the line ID-ID (for two teeth) in FIG. 1B.

An embodiment will be described in detail below with reference to the drawings.

FIGS. 1A to 1D illustrate a toothed belt B of an embodiment. The toothed belt B of the embodiment is an endless synchronous power transmission belt attached to an electric power steering device of an automobile, for example.

The toothed belt B of the embodiment includes a plurality of teeth 10A. The plurality of teeth 10A are spaced at a predetermined pitch in the belt length direction, and each of them protrudes toward the inner side of the belt. Here, in the present application, the teeth 10A are defined as parts protruding by 0.1 mm or more in the protruding direction of the teeth 10A with respect to a tooth bottom 10B between a pair of the teeth 10A adjacent to each other in the belt length direction.

The teeth 10A are what are called round teeth having a semicircular cross-section. The teeth 10A are what are called helical teeth configured as ridges extending in a direction inclined with respect to the belt width direction. The teeth 10A may be configured as ridges extending in the belt width direction or may be teeth having another shape like trapezoidal teeth having a trapezoidal cross-section.

The belt circumferential length (the belt length along the belt pitch line L) of the toothed belt B of the embodiment is, for example, 100 mm or more and 400 mm or less. The belt width is, for example, 4 mm or more and 30 mm or less. The maximum belt thickness is, for example, 1.1 mm or more and 3.0 mm or less.

The pitch P of the teeth 10A is, for example, 0.50 mm or more and 5.0 mm or less. The height of the teeth 10A is, for example, 0.50 mm or more and 2.0 mm or less. The height of the teeth 10A is defined by the length from the tooth bottom 10B to the tip of the teeth 10A. The width of the teeth 10A is, for example, 0.8 mm or more and 3.3 mm or less. The width of the teeth 10A is defined by the length between ends of the pair of the tooth bottoms 10B that are adjacent to each other and that sandwich the tooth 10A in the belt length direction. The inclination angle θ of the teeth 10A is, for example, more than 0° and 15° or less with respect to the belt width direction.

The toothed belt B of the embodiment includes a belt body 11, a cord 12, and a reinforcing fabric 13.

The belt body 11 includes a flat band portion 111 and a plurality of tooth bodies 112. The plurality of tooth bodies 112 are spaced at a constant pitch and integrated with an inner peripheral surface (one side) of the flat band portion 111. The thickness of the flat band portion 111 is, for example, 0.30 mm or more and 1.8 mm or less. The height of the tooth bodies 112 is, for example, 0.50 mm or more and 2.0 mm or less. The height of the tooth bodies 112 is defined by the length from the most inner peripheral part of the cord 12 embedded in the flat band portion 111 to the tip of the tooth body 112 as described later.

The belt body 11 is made of a rubber composition produced by heating and pressing an uncrosslinked rubber composition containing a rubber component to which various compound ingredients including a crosslinking agent are added, and thereby crosslinking the rubber component by a crosslinking agent.

Examples of the rubber component of the rubber composition forming the belt body 11 include hydrogenated nitrile rubber (H-NBR), chloroprene rubber (CR), chlorosulfonated polyethylene rubber (CSM), and ethylene-α-olefin elastomer (such as ethylene-propylene-diene terpolymer (EPDM)). Examples of the crosslinking agent include an organic peroxide and sulfur. Examples of the compound ingredient other than the crosslinking agent include a vulcanization accelerator aid, an antioxidant, a reinforcing material, a plasticizer, and a co-crosslinking agent.

The cord 12 is embedded in an inner peripheral part of the flat band portion 111 of the belt body 11. The cord 12 is provided to form a helical pattern with a pitch in the belt width direction. The outer diameter of the cord 12 is, for example, 0.15 mm or more and 0.80 mm or less.

The cord 12 is made of twisted yarn of glass fibers, aramid fibers, carbon fibers, metal fibers, and the like. The cord 12 is made of S-twist yarn and Z-twist yarn so as to form a double helical pattern. The cord 12 may be made of S-twist yarn alone or Z-twist yarn alone. For adhesion to the belt body 11, the cord 12 is suitably subjected to at least one of the following adhesion treatments: an RFL treatment by which the cord 12 is immersed in what is called an RFL aqueous solution and then heated; and a rubber cement treatment by which the cord 12 is immersed in rubber cement and then dried. Before the adhesion treatment, the cord 12 may be subjected to a base treatment by which the cord 12 is immersed in an epoxy solution or an isocyanate solution and then heated.

The reinforcing fabric 13 covers a surface of the belt body 11 on which the plurality of tooth bodies 112 are provided. The thickness of the reinforcing fabric 13 is, for example, 0.050 mm or more and 0.55 mm or less.

In the toothed belt B of the embodiment, the plurality of tooth bodies 112 of the belt body 11 are each covered by the reinforcing fabric 13 to form the teeth 10A. At the tooth bottom 10B, the cord 12 is embedded in an inner peripheral portion of the flat band portion 111 of the belt body 11 so as to be located immediately inside the reinforcing fabric 13.

In the toothed belt B of the embodiment, the kurtosis Sku of the surface roughness of the surface of the reinforcing fabric 13 is 2.15 or more at the teeth 10A. The kurtosis Sku of the surface roughness is an indicator of the sharpness of raised portions among raised portions and recessed portions on a surface, and is a degree normalized by dividing the fourth power mean of the height from the average plane of the uneven surface by the root mean square value raised to the fourth power, as defined by ISO 25178. The kurtosis Sku of the surface roughness can be measured using a contact or non-contact shape measuring device.

In the toothed belt B of the embodiment, the kurtosis Sku of the surface roughness of the surface of the reinforcing fabric 13 is 2.15 or more at the teeth 10A, whereby the belt running noise can be reduced. This seems because when raised portions among raised portions and recessed portions on the surface of the reinforcing fabric 13 are fully sharp, the air column noise is less likely to be produced. In general, when a toothed belt meshes with and hits a pulley, air is discharged from the gap therebetween at a specific frequency according to the same principle as that of a clap and thus the belt running noise is produced. In contrast, in the toothed belt B of the embodiment, raised portions among raised portions and recessed portions on the surface of the reinforcing fabric 13 that come into contact with the pulley are fully sharp, whereby the raised portions hit the pulley in the way the distal end of a brush does. Then, the air is discharged while the frequency is dispersed, and thus the belt running noise is reduced. From the viewpoint of reducing the belt running noise, the kurtosis Sku of the surface roughness of the surface of the reinforcing fabric 13 is suitably 2.20 or more, and more suitably 2.25 or more, at the teeth 10A.

The reinforcing fabric 13 is a woven fabric, a knitted fabric, an unwoven fabric, or the like. From the viewpoint of increasing the kurtosis Sku of the surface roughness of the surface of the reinforcing fabric 13 and thereby reducing the belt running noise, the reinforcing fabric 13 is suitably a woven fabric. The woven fabric as the reinforcing fabric 13 is woven with warp and weft. From the same viewpoint, the crossing angle between the warp and the weft of the woven fabric as the reinforcing fabric 13 is suitably 90° and the woven fabric is suitably provided so that the direction in which the warp extends is the belt width direction and the direction in which the weft extends is the belt length direction. The crossing angle between the warp and the weft may be other than 90°. The direction in which the warp extends may be inclined with respect to the belt width direction. The direction in which the weft extends may be inclined with respect to the belt length direction.

The following description assumes that the reinforcing fabric 13 is a woven fabric and that the warp and the weft between which the crossing angle is 90° extend in the belt width direction and the belt length direction, respectively.

Figure 2A:
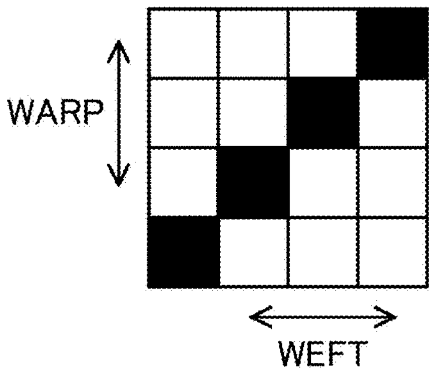
FIG. 2A is a weaving pattern of a twill fabric with 1/3 twill.
Figure 2B:
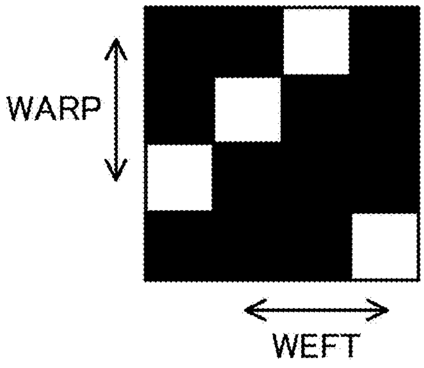
FIG. 2B is a weaving pattern of a twill fabric with 3/1 twill.
Figure 3A:
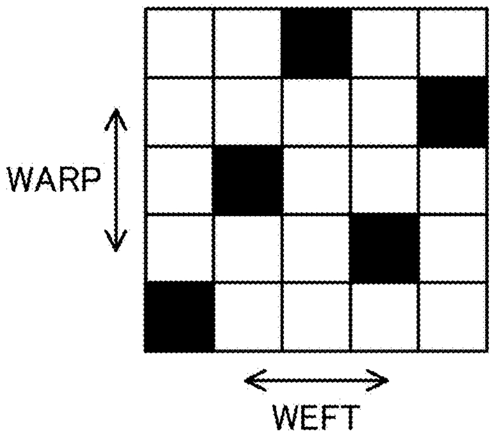
FIG. 3A is a weaving pattern of a satin fabric with 5-harness 2-counter satin.
Figure 3B:
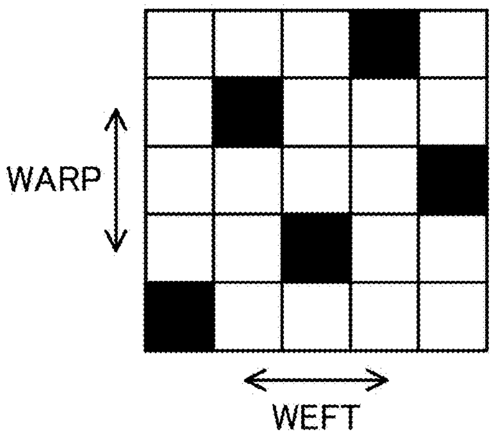
FIG. 3B is a weaving pattern of a satin fabric with 5-harness 3-counter satin.

In this case, examples of the weaving pattern of the woven fabric as the reinforcing fabric 13 include a plain weave, a twill weave, a satin weave, modified patterns of those weaves, and a special pattern. From the viewpoint of increasing the kurtosis Sku of the surface roughness of the surface of the reinforcing fabric 13 and thereby reducing the belt running noise, the weaving pattern of the woven fabric as the reinforcing fabric 13 is suitably a twill weave or a satin weave. Examples of the twill weave include 1/3 twill shown in FIG. 2A and 3/1 twill shown in FIG. 2B. Examples of the satin weave include 5-harness 2-counter satin shown in FIG. 3A and 5-harness 3-counter satin shown in FIG. 3B. In the weaving patterns of FIGS. 2A and 2B and FIGS. 3A and 3B, the warp is shown in black and the weft in white.

Examples of the fiber material of the warp include nylon fibers (aliphatic polyamide fibers), polyester fibers, aramid fibers (aromatic polyamide fibers), and cotton. From the viewpoint of increasing the kurtosis Sku of the surface roughness of the surface of the reinforcing fabric 13 and thereby reducing the belt running noise, the fiber material of the warp is suitably nylon fibers and more suitably nylon 6,6 fibers.

From the viewpoint of increasing the kurtosis Sku of the surface roughness of the surface of the reinforcing fabric 13 and thereby reducing the belt running noise, the fiber fineness of the warp is suitably 30 dtex or more and 300 dtex or less, and more suitably 90 dtex or more and 170 dtex or less. From the same viewpoint, the number of yarns of the warp per 5 cm width is suitably 200 or more and 500 or less, more suitably 220 or more and 275 or less, and still more suitably 240 or more and 260 or less. From the same viewpoint, the total fiber fineness of the warp per 5 cm width is suitably 15000 dtex or more and 60000 dtex or less, more suitably 20000 dtex or more and 30000 dtex or less, and still more suitably 25000 dtex or more and 29000 dtex or less.

Examples of the fiber material of the weft include nylon fibers (aliphatic polyamide fibers), polyester fibers, aramid fibers (aromatic polyamide fibers), and cotton. From the viewpoint of increasing the kurtosis Sku of the surface roughness of the surface of the reinforcing fabric 13 and thereby reducing the belt running noise, the fiber material of the weft is suitably nylon fibers, and more suitably nylon 6,6 fibers. From the same viewpoint, the fiber material of the weft is suitably the same as the fiber material of the warp, and the fiber materials for both the warp and the weft are suitably nylon fibers, and more suitably nylon 6,6 fibers.

The weft extends in the belt length direction so as to form the teeth 10A. Thus, the weft suitably is stretchable. The weft is suitably a woolly finished yarn or a covering yarn wrapped around a core material of a polyurethane elastic yarn.

From the viewpoint of increasing the kurtosis Sku of the surface roughness of the surface of the reinforcing fabric 13 and thereby reducing the belt running noise, the fiber fineness of the weft is suitably 40 dtex or more and 300 dtex or less, and more suitably 150 dtex or more and 160 dtex or less. From the same viewpoint, the ratio of the fiber fineness of the weft to the fiber fineness of the warp is suitably 0.5 or more and 2 or less, and more suitably 1 or more and 1.5 or less. From the same viewpoint, the fiber fineness of the weft is suitably greater than the fiber fineness of the warp.

From the viewpoint of increasing the kurtosis Sku of the surface roughness of the surface of the reinforcing fabric 13 and thereby reducing the belt running noise, the number of yarns of the weft per 5 cm width is suitably 120 or more and 350 or less, and more suitably 170 or more and 190 or less. From the same viewpoint, the ratio of the number of yarns of the weft per 5 cm width to the number of yarns of the warp per 5 cm width is suitably 0.5 or more and 0.9 or less, more suitably 0.6 or more and 0.85 or less, and still more suitably 0.65 or more and 0.8 or less. From the same viewpoint, the number of yarns of the weft per 5 cm width is suitably smaller than the number of yarns of the warp per 5 cm width.

From the viewpoint of increasing the kurtosis Sku of the surface roughness of the surface of the reinforcing fabric 13 and thereby reducing the belt running noise, the total fiber fineness of the weft per 5 cm width is suitably 15000 dtex or more and 50000 dtex or less, more suitably 20000 dtex or more and 29000 dtex or less, and still more suitably 27000 dtex or more and 28000 dtex or less. From the same viewpoint, the ratio of the total fiber fineness of the weft per 5 cm width to the total fiber fineness of the warp per 5 cm width is suitably 0.5 or more and 1.5 or less, more suitably 0.7 or more and 1.2 or less, and still more suitably 0.95 or more and 1.1 or less.

The reinforcing fabric 13 is suitably subjected to an adhesion treatment to adhere to the belt body 11. The adhesion treatment includes an RFL treatment, a soaking treatment, and a coating treatment.

The RFL treatment is a treatment in which the reinforcing fabric 13 is immersed in an RFL aqueous solution and then is heated. The RFL aqueous solution is a mixture of an initial condensate (RF) and a rubber latex (L), where the initial condensate (RF) is a condensate of resorcin (R) and formalin (F). Examples of the rubber latex (L) include vinylpyridine-styrene-butadiene copolymer rubber (VP-SBR) latex, chloroprene rubber (CR) latex, chlorosulfonated polyethylene rubber (CSM) latex, 2,3-dichlorobutadiene polymer rubber (2,3-DCB) latex, and nitrile-butadiene rubber (NBR) latex.

The soaking treatment is a treatment in which the reinforcing fabric 13 having been subjected to the RFL treatment is immersed in rubber cement with a low viscosity and then is dried. The coating treatment is a treatment in which rubber cement with a high viscosity is applied to the surface of the reinforcing fabric 13 having been subjected to the RFL treatment or the soaking treatment and then is dried, where this surface of the reinforcing fabric 13 is one of the surfaces that faces the belt body 11. The rubber cement used in the soaking treatment and the coating treatment is obtained by dissolving an uncrosslinked rubber composition in an organic solvent such as toluene, methyl ethyl ketone, or the like. The uncrosslinked rubber composition is, for example, an uncrosslinked rubber composition having a rubber component common to the rubber composition forming the belt body 11, or an uncrosslinked rubber composition having a rubber component containing a chlorine-based rubber such as chloroprene rubber (CR) and chlorosulfonated polyethylene rubber (CSM).

From the viewpoint of increasing the kurtosis Sku of the surface roughness of the surface of the reinforcing fabric 13 and thereby reducing the belt running noise, the reinforcing fabric 13 is suitably not subjected to the soaking treatment among the above treatments. The reinforcing fabric 13 is suitably subjected to the RFL treatment and the coating treatment except the soaking treatment. Thus, the RFL coating film that adheres to the fiber surface through the RFL treatment is suitably exposed on the surface of the reinforcing fabric 13.

The reinforcing fabric 13 may be subjected to a base treatment before the RFL treatment. The base treatment is a treatment in which the reinforcing fabric 13 still untreated before the RFL treatment is immersed in an epoxy solution or an isocyanate solution and then is heated.

Next, a method for forming the toothed belt B of the embodiment will be described with reference to FIG. 4 and FIGS. 5A to 5C. The method for forming the toothed belt B of the embodiment includes a material preparation step, a shaping step, a crosslinking step, and a finishing step.

<Material Preparation Step>

An uncrosslinked rubber composition with a relatively high rubber hardness is obtained by masticating a predetermined rubber component; putting various compound ingredients thereto; and then kneading this mixture. Then, the obtained uncrosslinked rubber composition is subjected to calendering or the like to prepare an uncrosslinked rubber composition sheet 11'.

The cord 12 is subjected to a contact treatment. The reinforcing fabric 13 is subjected to a contact treatment. At this time, as described above, the soaking treatment is suitably not performed, and the RFL treatment and the coating treatment are suitably performed. The base treatment is suitably performed as necessary. After the adhesion treatment, the reinforcing fabric 13 is formed into a cylindrical shape. At this time, the warp is put in the axial direction corresponding to the belt width direction, and the weft is put in the circumferential direction corresponding to the belt length direction.

<Shaping Step>

Figure 4:
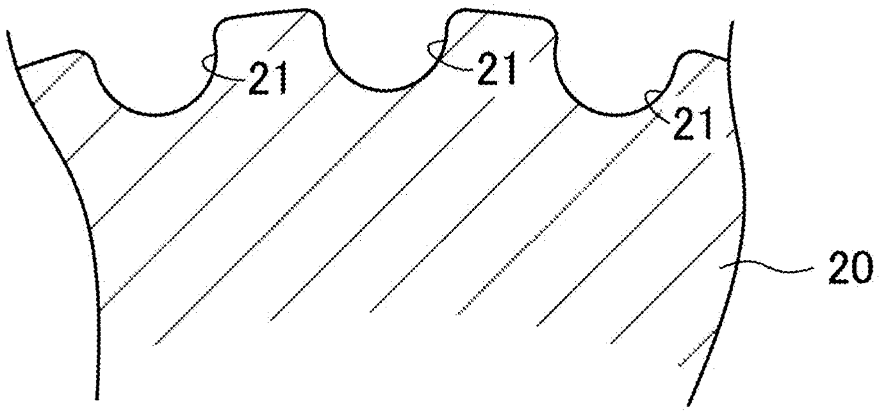
FIG. 4 is a partial cross-sectional view of a belt forming mold.

FIG. 4 shows a belt forming mold 20. The belt forming mold 20 has a cylindrical shape and has an outer peripheral surface provided with a plurality of tooth formation grooves 21 that extend in an oblique direction with respect to the axial direction and that are spaced in the circumferential direction.

Figure 5A:
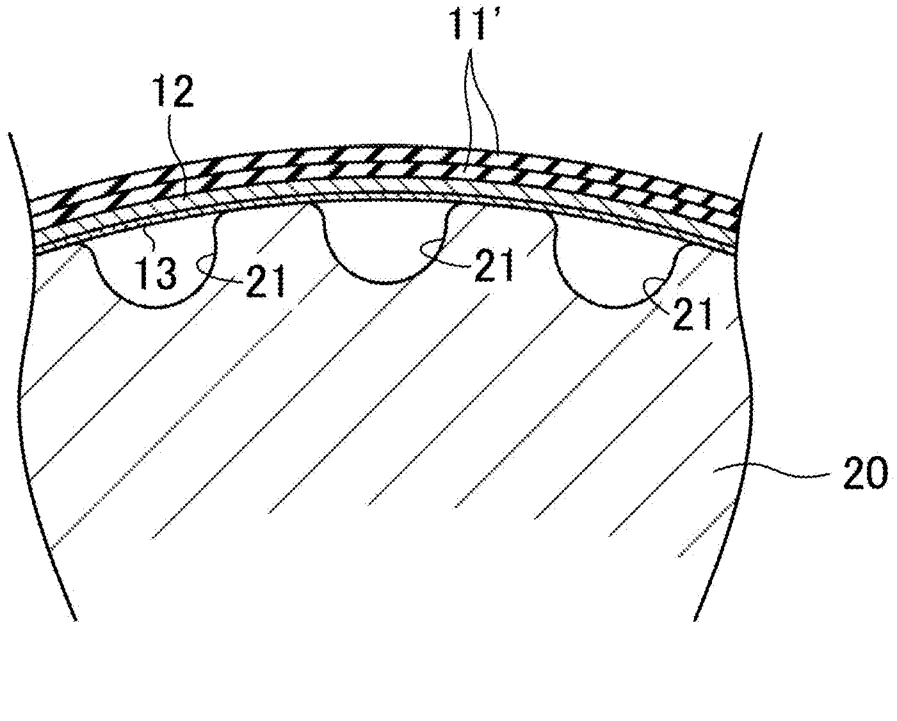
FIG. 5A is a first illustration of a method for forming the toothed belt of the embodiment.

As shown in FIG. 5A, the reinforcing fabric 13 in a cylindrical shape is placed over the outer peripheral surface of the belt forming mold 20, and then the cord 12 is spirally wrapped around the reinforcing fabric 13.

Then, the uncrosslinked rubber composition sheet 11' is wrapped around the cord 12 so that an uncrosslinked slab S' is formed on the belt forming mold 20. The uncrosslinked rubber composition sheet 11' is suitably used so that the grain direction corresponds to the belt length direction.

<Crosslinking Step>

Figure 5B:
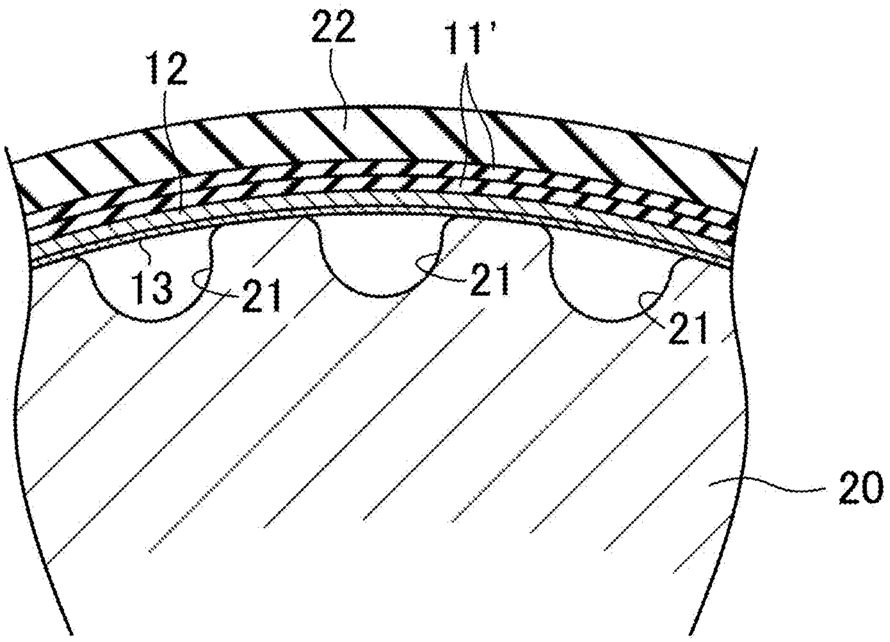
FIG. 5B is a second illustration of the method for forming the toothed belt of the embodiment.
Figure 5C:
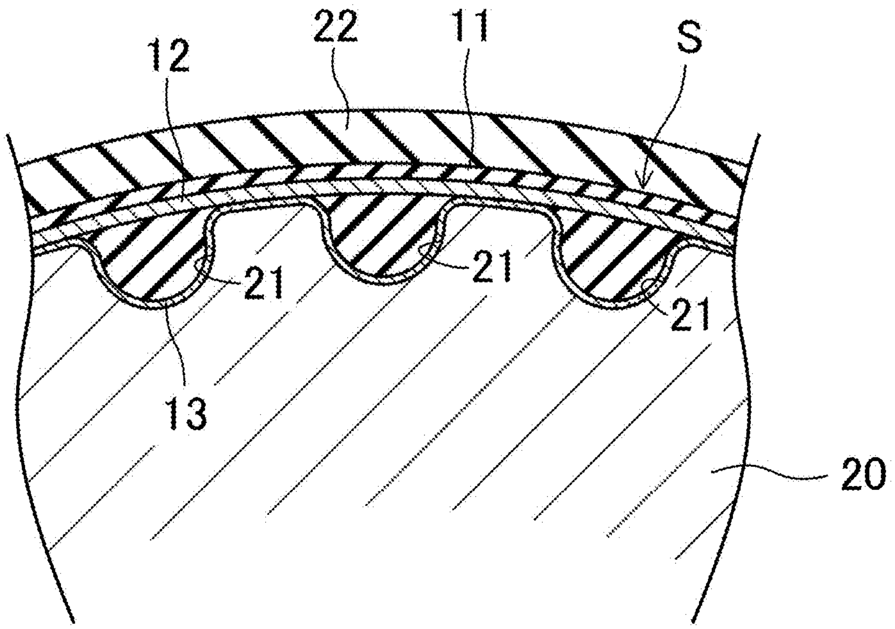
FIG. 5C is a third illustration of the method for forming the toothed belt of the embodiment.

As shown in FIG. 5B, a rubber sleeve 22 is placed over the uncrosslinked slab S' on the belt forming mold 20; these are placed together in a vulcanizer; and then the vulcanizer is sealed. Then, the vulcanizer is filled with high-temperature and high-pressure steam and then is held for a predetermined molding time. In this way, the uncrosslinked slab S' is pressed toward the belt forming mold 20 and is heated, whereby the uncrosslinked rubber composition sheet 11' passes between the cords 12; then presses the reinforcing fabric 13; then flows into each of the plurality of tooth formation grooves 21 of the belt forming mold 20; and then is crosslinked. At the same time, the cord 12 and the reinforcing fabric 13 are integrated together, and finally a belt slab S having a cylindrical shape is molded as shown in FIG. 5C.

<Finishing Step>

The inside of the vulcanizer is decompressed and then the vulcanizer is unsealed. Then, the belt slab S molded between the belt forming mold 20 and the rubber sleeve 22 is removed from the mold, and then is cut into round slices each having a predetermined width, whereby the toothed belt B of the embodiment is obtained.

EXAMPLES (Toothed Belt)

Toothed belts of the following Examples 1 to 3 and Comparative Example were prepared. The compositions of the reinforcing fabrics for these examples are shown in Table 1.

Example 1

The toothed belt of Example 1 employed a woven fabric of a 3/1 twill weave as a reinforcing fabric, where the reinforcing fabric was provided so that the direction in which the warp extends is the belt width direction and the direction in which the weft extends is the belt length direction. The warp of the woven fabric of a 3/1 twill weave as the reinforcing fabric was made of nylon 6,6 fibers with the fiber fineness of 110 dtex. The weft was a woolly finished yarn made of nylon 6,6 fibers with the fiber fineness of 156 dtex (78 dtex×2). The numbers of yarns of the warp and the weft per 5 cm width were 253 and 178, respectively.

The reinforcing fabric was subjected to an RFL treatment and a coating treatment in sequence as adhesion treatments. For the RFL treatment, an RFL aqueous solution containing CSM latex was used. For the coating treatment, rubber cement obtained by dissolving an uncrosslinked rubber composition containing H-NBR as a rubber component in methyl ethyl ketone was used. The reinforcing fabric was not subjected to a soaking treatment.

The toothed belt of Example 1 had a circumferential length of 364 mm, a width of 22 mm, and a maximum thickness of 2.1 mm. The belt body was made of a rubber composition containing EPDM as a rubber component. A twisted yarn of glass fibers was used for the cord.

Example 2

The toothed belt of Example 2 employed a woven fabric of 5-harness 2-counter satin as a reinforcing fabric. The warp of the woven fabric of 5-harness 2-counter satin as the reinforcing fabric was made of nylon 6,6 fibers with the fiber fineness of 110 dtex. The weft was a woolly finished yarn made of nylon 6,6 fibers with the fiber fineness of 78 dtex. The numbers of yarns of the warp and the weft per 5 cm width were 270 and 240, respectively. The other configurations were the same as those of Example 1.

Example 3

The toothed belt of Example 3 employed a woven fabric of a 1/3 twill weave as a reinforcing fabric. The warp of the woven fabric of a 1/3 twill weave as the reinforcing fabric was made of nylon 6,6 fibers with the fiber fineness of 110 dtex. The weft was a woolly finished yarn made of nylon 6,6 fibers with the fiber fineness of 156 dtex (78 dtex×2). The numbers of yarns of the warp and the weft per 5 cm width were 276 and 178, respectively. The other configurations were the same as those of Example 1.

COMPARATIVE EXAMPLE

The toothed belt of Comparative Example employed a woven fabric of a 3/1 twill weave as a reinforcing fabric. The warp of the woven fabric of a 3/1 twill weave as the reinforcing fabric was made of nylon 6,6 fibers with the fiber fineness of 44 dtex. The weft was a woolly finished yarn made of nylon 6,6 fibers with the fiber fineness of 156 dtex (78 dtex×2). The numbers of yarns of the warp and the weft per 5 cm width were 393 and 168, respectively. The other configurations were the same as those of Example 1.

TABLE 1

| | | Example 1 | Example 2 | Example 3 | Comparative Example |
|---|---|---|---|---|---|
| Weaving pattern | | 3/1 twill | 5-harness 2-counter satin | 1/3 twill | 3/1 twill |
| Warp | Fiber material | Nylon 6,6 | Nylon 6,6 | Nylon 6,6 | Nylon 6,6 |
| | Fiber fineness (dtex) | 110 | 110 | 110 | 44 |
| | Number of yarns (per 5 cm) | 253 | 270 | 276 | 393 |
| | Total fiber fineness (dtex per 5 cm) | 27830 | 29700 | 30360 | 17292 |
| Weft | Fiber material | Nylon 6,6 | Nylon 6,6 | Nylon 6,6 | Nylon 6,6 |
| | Fiber fineness (dtex) | 156 | 78 | 156 | 156 |
| | Number of yarns (per 5 cm) | 178 | 240 | 178 | 168 |
| | Total fiber fineness (dtex per 5 cm) | 27768 | 18720 | 27768 | 26208 |
| Fiber fineness of weft / Fiber fineness of warp | | 1.42 | 0.71 | 1.42 | 3.55 |
| Number of yarns of weft / Number of yarns of warp | | 0.70 | 0.89 | 0.64 | 0.43 |

TABLE 1-continued

| | Example 1 | Example 2 | Example 3 | Comparative Example |
|---|---|---|---|---|
| Total fiber fineness of weft / Total fiber fineness of warp | 1.00 | 0.63 | 0.91 | 1.52 |
| Kurtosis (Sku) | 2.29 | 2.23 | 2.17 | 2.14 |
| Belt running sound (dB) | 69.6 | 70.8 | 71.2 | 75.2 |

(Test Method)

<Kurtosis Sku of Surface Roughness of Surface of Reinforcing Fabric Measured at Teeth>

For the toothed belt of each of Examples 1 to 3 and Comparative Example, the kurtosis Sku of the surface roughness of the surface of the reinforcing fabric was measured at the teeth, using a contact or non-contact shape measuring device (Digital Microscope VHX-6000 manufactured by KEYENCE CORPORATION).

<Belt Running Noise>

Figure 6A:
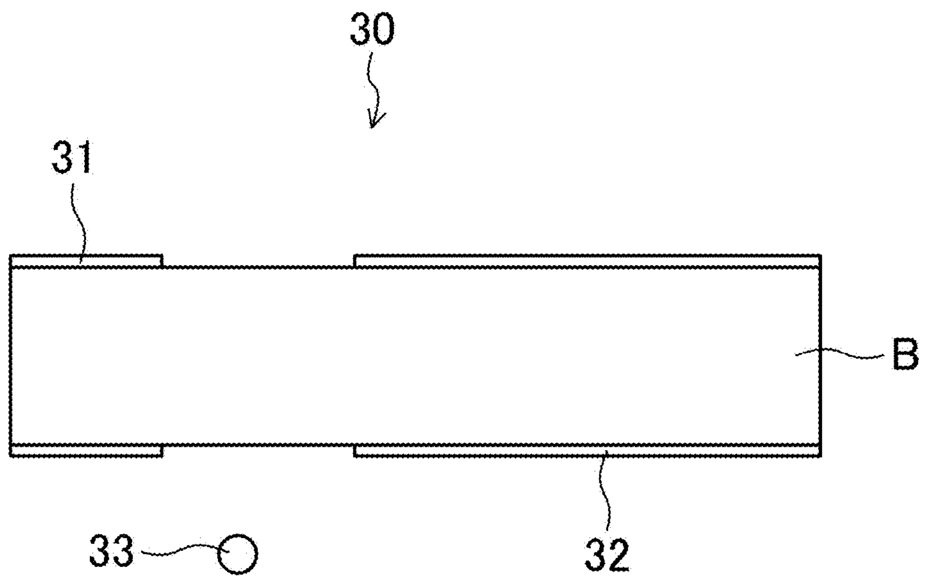
FIG. 6A is a plan view of a belt running tester for measuring belt running noise.
Figure 6B:
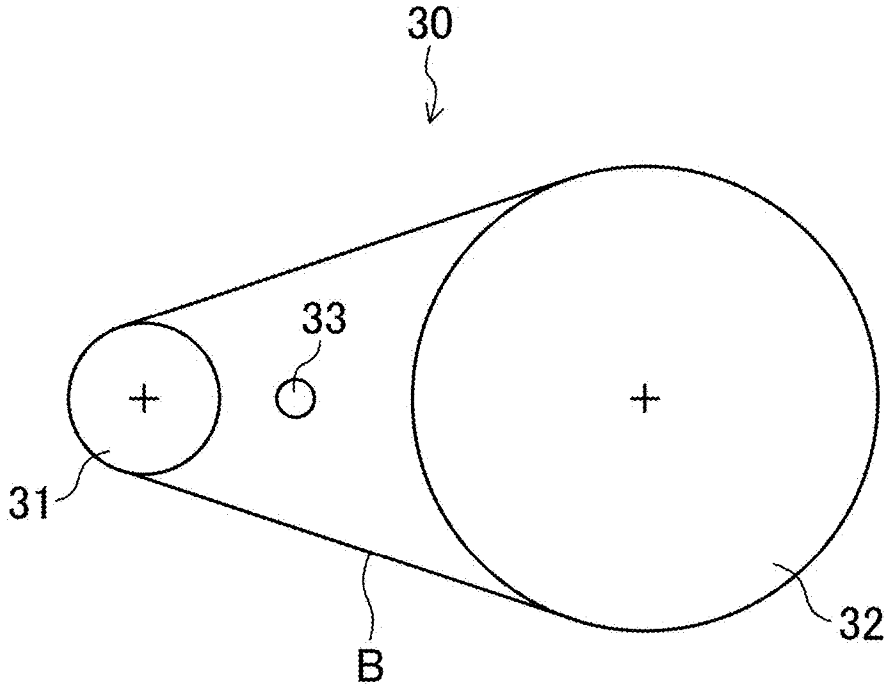
FIG. 6B is a front view of the belt running tester for measuring belt running noise.

FIGS. 6A and B show the layout of pulleys of a belt running tester 30 for measuring belt running noise. The belt running tester 30 includes a drive pulley 31 with 41 teeth; a driven pulley 32 that is provided next to the drive pulley 31, that is movable right and left, and that has 117 teeth; and a sound collection microphone 33. The driven pulley 32 is configured so that a constant load (SW) can be applied to the driven pulley 32 in the direction in which the driven pulley 32 moves away from the drive pulley 31 and also so that a rotational torque can be applied to the driven pulley 32. The sound collection microphone 33 is provided so that its center is positioned apart by 30 mm from the axial center of the drive pulley 31 toward the driven pulley 32 and apart by 20 mm from the front end surface of the drive pulley 31.

The toothed belt B of each of Examples 1 to 3 and Comparative Example was wrapped around the drive pulley 31 and the driven pulley 32 of the belt running tester 30. A constant load (SW) was applied to the driven pulley so that the toothed belt B was tense at a belt tension of 100 N, and also a rotational torque of 7 N·m was applied to the driven pulley. The rotational speed of the drive pulley 31 was increased from 200 rpm to 3000 rpm in 10 seconds, and the belt running noise at this time was collected by the sound collection microphone 33. Then, an order analysis of the collected noise by an FFT analysis was conducted to determine the average sound pressure level.

(Test Results)

The test results are shown in Table 1. These show that the average sound pressure level is lower and thus the belt running noise is smaller in Examples 1 to 3 where the kurtosis Sku of the surface roughness of the surface of the reinforcing fabric is 2.15 or more at the teeth than in Comparative Example where the kurtosis Sku of the surface roughness of the surface of the reinforcing fabric is 2.14 at the teeth.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A toothed belt comprising:

a belt body including a flat band portion and a plurality of tooth bodies spaced at a constant pitch and integrated with one of surfaces of the flat band portion; and a reinforcing fabric covering a surface of the belt body on which the plurality of tooth bodies are provided, the plurality of tooth bodies being each covered by the reinforcing fabric to form teeth, wherein kurtosis of a surface roughness of a surface of the reinforcing fabric is 2.15 or more at the teeth.

2. The toothed belt of claim 1, wherein the reinforcing fabric is a woven fabric.

3. The toothed belt of claim 2, wherein a weaving pattern of the woven fabric as the reinforcing fabric is a twill weave or a satin weave.

4. The toothed belt of claim 2, wherein a crossing angle between warp and weft of the woven fabric as the reinforcing fabric is 90° and the woven fabric is provided so that a direction in which the warp extends is a belt width direction and a direction in which the weft extends is a belt length direction.

5. The toothed belt of claim 4, wherein a fiber material of the warp and the weft is nylon 6,6 fibers.

6. The toothed belt of claim 4, wherein a fiber fineness of the warp is 30 dtex or more and 300 dtex or less, and a fiber fineness of the weft is 40 dtex or more and 300 dtex or less.

7. The toothed belt of claim 4, wherein a ratio of the fiber fineness of the weft to the fiber fineness of the warp is 0.5 or more and 2 or less.

8. The toothed belt of claim 4, wherein the fiber fineness of the weft is greater than the fiber fineness of the warp suitably.

9. The toothed belt of claim 4, wherein the number of yarns of the warp per 5 cm width is 200 or more and 500 or less, and the number of yarns of the weft per 5 cm width is 120 or more and 350 or less.

10. The toothed belt of claim 4, wherein a ratio of the number of yarns of the weft per 5 cm width to the number of yarns of the warp per 5 cm width is 0.5 or more and 0.9 or less.

11. The toothed belt of claim 4, wherein the number of yarns of the weft per 5 cm width is smaller than the number of yarns of the warp per 5 cm width.

12. The toothed belt of claim 4, wherein a total fiber fineness of the warp per 5 cm width is 15000 dtex or more and 60000 dtex or less, and a total fiber fineness of the weft per 5 cm width is 15000 dtex or more and 50000 dtex or less.

13. The toothed belt of claim 4, wherein a ratio of the total fiber fineness of the weft per 5 cm width to the total fiber fineness of the warp per 5 cm width is 0.5 or more and 1.5 or less.

14. The toothed belt of claim 1, wherein the reinforcing fabric is not subjected to a soaking treatment that is a treatment in which the reinforcing fabric is immersed in rubber cement and then is dried.

15. The toothed belt of claim 1, wherein an RFL coating film that adheres to a fiber surface through an RFL treatment is exposed on a surface of the reinforcing fabric.

* * * * *